United States Patent [19]

McDaniel

[11] Patent Number: 4,547,557

[45] Date of Patent: Oct. 15, 1985

[54] SILICA-TITANIA COGEL FROM TWO-STEP HYDROLYSIS

[75] Inventor: Max P. McDaniel, Bartlesville, Okla.

[73] Assignee: Phillips Petroleum Company, Bartlesville, Okla.

[21] Appl. No.: 629,152

[22] Filed: Jul. 9, 1984

[51] Int. Cl.[4] ........................ C08F 4/02; C08F 10/02
[52] U.S. Cl. .................... 526/106; 502/236; 502/242; 502/256; 526/96; 526/130; 526/352
[58] Field of Search ...................... 502/236, 242, 256; 526/106, 130, 96

[56] References Cited

U.S. PATENT DOCUMENTS 4,006,175  2/1977  Termin et al.
4,176,089  11/1979 Cull ..................................... 502/236
4,206,297  6/1980  Hoff et al.
4,301,034  11/1981 McDaniel ........................... 502/256
4,405,768  9/1983  McDaniel .
4,410,501  10/1983 Taramasso et al. ................. 502/242

Primary Examiner—Edward J. Smith
Attorney, Agent, or Firm—French and Doescher

[57] ABSTRACT

A silica-titania cogel is produced in a two-step process wherein in the first step an alkyl polysilicate and/or a tetraalkyl silicate is partially hydrolyzed in an alkaline organic solvent using insufficient water to complete hydrolysis and thereafter a tetraalkyl titanate and an excess of water are added to complete the hydrolysis. The resulting product is as good or better than silica-titania cogels made by expensive prior art techniques and offers the advantage of not requiring washing step to remove alkali metal ions and thus also does not require an azeotrope drying step to remove water.

25 Claims, No Drawings

SILICA-TITANIA COGEL FROM TWO-STEP HYDROLYSIS

BACKGROUND OF THE INVENTION

This invention relates to the production of silica-titania cogels.

Since its commercialization in the 1950's, chromium oxide on silica has become the dominant catalyst system used throughout the world to produce high density polyethylene. Over the years various refinements have been made in these catalysts, one of the most significant being the discovery that the presence of titanium imparts many beneficial characteristics to the catalyst. It has further been discovered that the very best results are generally obtained by coprecipitating an alkali metal silicate and a titanium compound to give a silica-titania cogel. While this represents an extraordinarily satisfactory product from the standpoint of catalyst properties, it is hard to make because of the necessity to wash out alkali metal ions and because of the necessity to use a volatile, water-miscible organic solvent to very carefully remove the water.

SUMMARY OF THE INVENTION

It is an object of this invention to produce a silica-titania cogel which does not require a washing step to remove alkali metal ions;

it is a further object of this invention to produce a silica-titania cogel which does not require the use of a water-miscible organic solvent to gently remove the water;

it is yet a further object of this invention to provide an improved polymerization catalyst; and it is still a further object of this invention to provide an improved polymerization process.

In accordance with this invention an organopolysilicate and/or a tetraorganosilicate are partially hydrolyzed in an organic solvent under alkaline conditions in a first hydrolysis step and thereafter a titanium tetraalkoxide is combined with the partially hydrolyzed product of the first step, followed by enough water in a second hydrolysis step to complete the hydrolysis, and finally further base is added to affect gelation.

DESCRIPTION OF THE PREFERRED EMBODIMENTS

The organopolysilicate and tetraorganosilicate utilized in forming the cogels of this invention can be represented by the formula below where R is an alkyl, aryl or alkaryl group containing from 1 to 8 carbon atoms, preferably from 2 to 4 carbon atoms and n is 0–8:

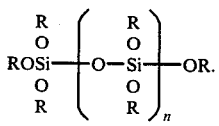

The scope of the R groups can be the same with the polysilicate (where n is 1–8) as with the tetraorganosilicate (where n is 0) but generally as a matter of convenience the preferred group for the tetraorganooxysilicate is n-propyl (tetra-n-propoxysilicate) and the preferred group for the polysilicate is ethyl (ethyl polysilicate). Other suitable organopolysilicates and tetraorganosilicates include for example tetraisobutoxysilane, tetra-n-phenoxysilane, tetra-n-hexoxysilane, tetramethoxysilane, tetraethoxysilane, tetraisopropoxysilane, tetra(2-ethylhexoxy)silane, tetraphenoxysilane, hexaethoxydisiloxane, and methyltris(tri-sec-butoxysiloxy)silane.

The preferred silicate esters are those where n is greater than 0 simply because for given weight there is a greater weight percentage of silicon in the polysilicate than in the tetraorganosilicate.

The organic solvent employed in the process of this invention can be any liquid which mutually dissolves or is at least sufficiently miscible with water, the silicate ester (tetraorganosilicate or polysilicate) and the resulting partially hydrolyzed silicate ester, that phase separation does not occur during the hydrolysis. Preferably, oxygen-containing, normally liquid organic materials are used although other materials can be used. It is most convenient to use a saturated aliphatic alcohol containing from 1 to 6 carbon atoms, preferably 2 to 4 carbon atoms as the solvent, since an alcohol is formed from the silicate esters during their hydrolysis. Sometimes, particularly with the tetraorganoxysilicate esters, the alcohol solvent and silicon ester are chosen so that the ester on hydrolysis gives the same alcohol as is already present or at least has the same number of carbon atoms, although this is by no means an essential criteria. Exemplary solvents include acetone, methylethyl ketone, ethyl acetate, methanol, ethanol, 1-propanol, 2-propanol, 1-butanol, 2-butanol, 2-methyl-1-propanol, 2-methyl-2-propanol, 1-pentanol, 2-pentanol, 3-methyl-1-butanol, 3-methyl-2-butanol, 3-pentanol, 2-methyl-2-butanol, 2,2-dimethyl-1-propanol, 2-methyl-1-butanol, 1-hexanol, and other liquid alcohols. Presently preferred compounds include ethanol and the 3- and 4-carbon alcohols because of their availability and solubility in water. The 3 and 4 carbon atom alcohols are preferred over ethanol because of their slightly lower volatility.

The titanium tetraalkoxide can be represented by the general formula Ti(OR')$_4$ wherein R' is a 1–6, preferably 2–4 carbon atom alkyl group. The most preferred compound is tetraisopropyl titanate.

The titanium ester can be added in an amount sufficient to give ½–20, preferably 1–5 wt. percent Ti in the final catalyst.

In the first hydrolysis step the amount of water employed ranges from 10–90 preferably 15–60 percent of the stoichiometric amount required for complete hydrolysis. This water can simply come from the alkaline solution used to give alkaline conditions or water can be added separately instead of or in addition to that from the concentrated ammonium hydroxide or whatever aqueous base is being used.

After the partially hydrolyzed product of the first hydrolysis step is reacted with the titanium tetraalkoxide, water is added in the second hydrolysis step in an amount which brings the total added water within the range of 1 to 10 preferably 1.5–5 times the stoichiometric amount needed to complete the hydrolysis.

The agent utilized to produce the alkaline conditions for the hydrolysis steps is preferably ammonia or concentrated ammonium hydroxide. Other suitable bases include normally gaseous or liquid primary, secondary or tertiary alkyl or cycloalkylamines which are at least partially stable in the organic solvent employed. Examples of the amines include methylamine, ethylamine, dodecylamine, octadecylamine, 2-ethylhexylamine, cyclohexylamine, diisopropylamine, didodecylamine, trioctylamine, and the like. Also suitable are tetraalkylammonium hydroxides such as tetramethylammonium hydroxide. However, concentrated ammonium hydroxide is preferred because of its low cost. The same scope of alkaline agent can be used to precipitate the cogel from the resulting sol (silica colloid) after the hydrolysis is complete, again concentrated ammonium hydroxide being preferred.

After the formation of the cogel, it is preferably aged at room temperature to 100° C., preferably 50° to 100° C. for at least 10 minutes preferably 1 to 50 hours, more preferably 1 to 4 hours. If desired additional solvent can be added at this point in order to form a slurry. The aging can be done at any temperature from room temperature to reflux temperature for the solvent but preferably is at or about the reflux temperature.

The resulting cogel can be dried by conventional simple techniques such as oven drying, vacuum drying, or tray drying to produce a xerogel. The drying temperature can be from room temperature to 400° C. but is preferably above the boiling point of the organic solvent. Because of the essentially anhydrous nature of the process the use of an azeotrope to remove water in a gentle manner so as to avoid collapse of the pores is totally unnecessary as are conventional washing steps to remove alkali metal ions since no alkali metal ions are present. Water is present when an excess of the stoichiometric amount is used in the second hydrolysis step but this does not require the use of elaborate azeotrope drying for two reasons. First the amount of water present even if 10 times the amount needed for complete hydrolysis is used, is still a relatively small amount based on the solvent. Second, the critical factor in prior art techniques is removing water from the pores without collapse. Here the pores start out filled with alcohol rather than water since alcohol is the by-product of the hydrolysis reaction to produce the silica, i.e. Si(OR)$_4$+2H$_2$O gives SiO$_2$ plus 4ROH.

If the purpose is to produce a support for chromium olefin polymerization catalysts the chromium can be coprecipitated with the silica-titania cogel, thus producing a tergel of silica-titania-chromium. Alternatively the chromium compound can be added anhydrously to the resulting gel. Any chromium compound can be utilized as is known in the art. For instance, the support can be activated and thereafter a zerovalent chromium compound utilized or a chromium compound such as chromium oxide, chromium acetate, chromium nitrate or tertiary-butyl chromate can be added and thereafter the chromium-containing composition activated. The activation is carried out in an oxygen-containing ambient such as air at a temperature of 300° to 900° C., preferably 500° to 700° C. for a time of at least five minutes, preferably ten minutes to ten hours, more preferably 30 minutes to three hours.

The chromium compound is used in an amount sufficient to give 0.1 to 10, preferably 0.5 to 2, most preferably about 1, weight percent chromium based on the weight of dried silica, i.e. the xerogel, plus chromium compound.

The catalysts of this invention can be used to polymerize at least one mono-1-olefin containing 2 to 8 carbon atoms per molecule. The invention is of particular applicability in producing ethylene homopolymers and copolymers from mixtures of ethylene and 1 or more comonomers selected from 1-olefins or dienes containing 3 to 8 carbon atoms per molecule. Exemplary comonomers include aliphatic 1-olefins, such as propylene, 1-butene, 1-hexene, and the like and conjugated or nonconjugated diolefins, such as 1,3-butadiene, isoprene, piperylene, 2,3-dimethyl-1,3-butadiene, 1,4-pentadiene, 1,5-hexadiene, and the like and mixtures thereof. Ethylene copolymers preferably constitute about 90, preferably 95 to 99 mole percent polymerized ethylene units. Most preferred monomers are at least one of ethylene, propylene, 1-butene, and 1-hexene.

The polymers can be prepared from the activated catalysts of this invention by solution polymerization, slurry polymerization, and gas phase polymerization techniques using conventional equipment and contacting processes. However, the catalysts of this invention are particularly suitable in slurry polymerizations for the production of high melt index (MI) polymers. Particle form (slurry) polymerizations are carried out in an inert diluent such as a paraffinic, aromatic or cycloparaffinic hydrocarbon at a temperature where the resulting polymer is insoluble. For predominantly ethylene polymer, the particle form process is carried out at a temperature of about 66° to 110° C.

The catalysts of this invention can be used with conventional cocatalysts such as triethylaluminum, diethyl aluminum chloride, ethyl aluminum dichloride, triethylborane, and other known organometal cocatalysts preferably boron and aluminum alkyls, the alkyl groups generally being 1-4 carbon atoms, if desired. Also, hydrogen can be used to further increase the melt index if desired.

While the primary emphasis of this invention is on a simplified method of producing catalysts essentially identical to that produced with conventional techniques but without the necessity for removing alkali metal ions in water, the catalyst is not necessarily exactly identical to that produced by the conventional methods in that it is slightly more active and produces considerably higher melt flow polymer both of which are desirable characteristics.

EXAMPLE 1

Invention Catalyst A

Invention catalyst A consists of silica-titania cogel impregnated with methanolic chromium nitrate solution sufficient to provide a composite, after calcining in air, containing a calculated amount of TiO$_2$ sufficient to give 1.5 weight percent titanium chromium oxide sufficient to give 1.0 weight percent chromium and the balance as silica. Invention catalyst A was prepared by admixing 100 mL of 1-propanol (1338 mmoles), 100 mL of Silbond ® 40, a partly hydrolyzed tetraethoxysilane with a substantial portion thereof having an average of 4–5 silicon atoms per molecule and 40 weight percent SiO$_2$ content, available commercially from the Stauffer Chemical Co., Westport, Conn, and 5 mL of concentrated ammonium hydroxide (28 wt. % NH$_3$, about 75 mmoles NH$_3$ and 180 mmoles H$_2$O) yielding a clear solution. Since 14.5 mL water are required to completely hydrolyze 100 mL of Silbond 40 ®, this represents about 25 percent hydrolysis. However, the NH$_4$OH may also react to an unknown degree to make Si—NH$_2$ or other groups. After stirring 5 minutes, 5 mL (17.5 mmoles) of tetraisopropyl titanate [Ti(O—i—Pr)$_4$] was added to react with the siloxane chains resulting in a clear, rather viscous solution. By siloxane chains is meant the chains resulting from the partial hydrolysis of the organopolysilicate and/or tetraorganosilicate, such as:

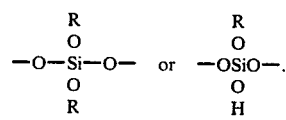

The titanium ester is believed to react with hydroxyls on these chains, and thus become immobilized. After stirring the solution for 5 minutes, 20 mL (1111 mmoles) of deionized water was added and the resulting clear solution was stirred an additional 5 minutes. The fact that $TiO_2$ did not precipitate out indicates that the titanium ester had indeed reacted with the silica sol. Then 5 mL of concentrated ammonium hydroxide was added with stirring resulting in the formation of a clear colorless hard gel within about 2 minutes. This brings the total water added up to 27.2 mL or about 190 percent of that required for complete hydrolysis. The gel was allowed to sit undisturbed at ambient conditions over the weekend (about 65 hours), then it was aged for 2 hours at 80° C. and dried overnight at 80° C. in a vacuum oven. The dry product was crushed and screened through a 35 mesh screen and the screened material was impregnated with a methanolic solution of $Cr(NO_3)_3.9-H_2O$, containing 0.01 g Cr/mL, sufficient to provide 1.0 weight percent Cr, based on the finished, activated (calcined) composite. After calcining for 3 hours in dry air at 850° C. in a fluidized bed, the cooled product, flushed with nitrogen was stored for subsequent testing. Analysis disclosed the catalyst had a B.E.T. surface area of 404 $m^2/g$ and a pore volume by alcohol adsorption of 2.19 mL/g.

EXAMPLE 2

Invention Catalyst B

Invention catalyst B consists of silica-titania cogel impregnated with alcoholic chromium nitrate solution sufficient to provide a composite, after calcining in dry air, containing a calculated 5.0 weight percent Ti as $TiO_2$, 1.0 weight percent Cr as chromium oxide and the balance as silica. Invention catalyst B was prepared in a manner similar to that of invention catalyst A by admixing 100 mL of 1-propanol, 100 mL of Silbond ® 40 and 5 mL of concentrated ammonium hydroxide, that is to say enough water to effect about 25 percent hydrolysis. After stirring the resulting solution for 3 minutes, 12.4 mL (43.5 mmoles) of Ti(O—i—Pr)$_4$ were added to react with the siloxane chains. After 3 minutes stirring, 30 mL (1667 mmoles) of deionized $H_2O$ was added and the resulting clear solution was stirred for 3 minutes. At that time a solution of 15 mL of concentrated ammonium hydroxide equivalent to about 225 mmoles NHs and about 540 mmoles $H_2O$ in 40 mL of 1-propanol was quickly added resulting in the formation of a clear, hard gel in about 30 seconds. Thus the total added water was about 44.4 ml or 300 percent of that required for hydrolysis. As before the gel was allowed to sit undisturbed over the weekend, then aged for 2 hours at 80° C. and dried overnight at 80° C. in a vacuum oven. After crushing and screening through a 35 mesh screen, the resulting product was impregnated with sufficient of the methanolic solution of $Cr(NO_3)_3.9H_2O$ as before to provide 1.0 weight percent Cr, based on the finished, activated composite. The composite was then activated as before. Analysis disclosed the catalyst to have a surface area of 356 $m^2/g$ and a pore volume of 2.29 mL/g.

EXAMPLE 3

Invention Catalyst C

Invention catalyst C consists of a silica-titania-chromia tergel which after calcining in dry air, contains 3.6 weight percent Ti as $TiO_2$, 1.0 weight percent Cr as chromium oxide and the balance as silica. Invention catalyst C was prepared in a manner similar to those of the previous Examples by admixing 100 mL of 1-propanol, 100 mL of Silbond ® 40 and 5 mL of concentrated ammonium hydroxide. After stirring the resulting solution for about 3 minutes, 9.0 mL (31.6 mmoles) of Ti(O—i—Pr)$_4$ were added to react with the siloxane chains resulting again in a clear solution. To the clear solution was added sufficient of methanolic chromium acetate solution containing 0.01 g Cr per mL to provide the desired 1.0 weight percent Cr resulting in a clear green solution. To the solution was added 20 mL of deionized water and then 5 mL of concentrated ammonium hydroxide. This brings the total water added up to about 190 percent that required for hydrolysis. Within 1 minute a hard, clear green gel formed. As before the gel was allowed to sit undisturbed over the weekend, then aged for 2 hours at 80° C. and dried overnight in a vacuum oven at 80° C. The dry product was screened through a 35 mesh screen and activated for 3 hours at 850° C. in dry air as before. Analysis disclosed the catalyst had a surface area of 501 $m^2/g$ and a pore volume of 2.02 mL/g.

EXAMPLE 4

Control Cogel Catalyst D

The control Catalyst D employed was a commercially obtained catalyst containing $TiO_2$ sufficient to give 2.5 weight percent Ti, chromium oxide sufficient to give 1.0 weight percent Cr and the balance as silica. It can be prepared as disclosed in U.S. Pat. No. 4,081,407 by contacting an aqueous solution of sodium silicate with an aqueous sulfuric acid solution containing titanyl sulfate to form a hydrogel. The hydrogel was aged, then repeatedly washed with water to reduce the sodium ion content to less than about 0.1 weight percent. The purified hydrogel is then impregnated with an aqueous solution of chromium(III) acetate sufficient to provide the desired quantity of Cr. Water is then removed from the mixture by azeotrope distillation with an alcohol such as 1-hexanol and the resulting product is activated in dry air as before to obtain the finished catalyst. Analysis disclosed the catalyst had a surface area of 430 $m^2/g$ and a pore volume of 2.25 mL/g.

EXAMPLE 5

Ethylene Polymerization

Ethylene polymerization runs were conducted in stirred, 2 liter, stainless steel reactor containing 1 liter of isobutane diluent containing 8 ppm triethylborane (TEB) adjuvant based on the weight of diluent. Charging order was catalyst, diluent and then sufficient ethylene supplied from a pressurized reservoir to maintain a reactor pressure of about 565 psia at the reactor temperature selected. Generally, a run was conducted for a time sufficient to produce approximately 3,000 g polymer per g catalyst. The recovered polymer in each run was dried, weighed and stabilized with a conventional antioxidant system, e.g. 2,6-di-t-butyl-4-methylphenol.

Productivity is expressed as that observed (OBS) in terms of g polymer per g solid catalyst per actual run time. It is also expressed as normalized (NORM) to a common run time of, e.g., 30 minutes for a better comparison in terms of g polymer per g solid catalyst per 30 minutes.

Melt index (MI) was determined in accordance with ASTM D1238, condition E.

High load melt index (HLMI) was determined in accordance with ASTM D1238, condition F.

HLMI/MI is thought to be related to polymer molecular weight distribution with the greater the value the broader the distribution.

The results are presented in Table I.

son catalyst D of Example 4. The mercury intrusion profile of the interior pore volumes in each catalyst was determined by a standard mercury intrusion porosimetry method such as one described in ASTM D2873-70.

The results of the porosimetry tests are given in Table II in terms of cc/g at the specified pore size range in angstroms.

TABLE II

| | Interior Porosity Of Catalysts By Mercury Intrusion Porosimetry | | | | | | | | | |
|---|---|---|---|---|---|---|---|---|---|---|
| Pore Size, angstroms | 30–90 | 90–300 | 300–600 | 600–900 | 900–2000 | 2000–4000 | 4000–10,000 | 10,000–20,000 | 20,000–100,000 | Total |
| Invention Catalyst E | 0.248 | 0.41 | 0.31 | 0.21 | 0.40 | 0.21 | 0.18 | 0.07 | 0.12 | 2.16 |
| Comparison Catalyst F | 0.230 | 0.45 | 0.33 | 0.17 | 0.36 | 0.19 | 0.14 | 0.07 | 0.15 | 2.09 |

The porosimetry data in Table II show that the invention catalyst made by the 2-step hydrolysis process and a comparison catalyst made by aqueous coprecipitation have nearly the same mercury intrusion profile. In fact, the data suggest that the invention catalyst may have slightly more volume inside the larger pores than does the comparison catalyst which is desirable in a 1-olefin polymerization catalyst.

Each catalyst was activated at 850° C. and tested in

TABLE I

| | Ethylene Polymerization, No Hydrogen Present | | | | | | | | |
|---|---|---|---|---|---|---|---|---|---|
| | Catalyst | | Reactor | Polymer | Calculated Productivity | | g/10 min. | | HLMI |
| Run No | No | Wt % Ti | Wt mg | Temp. °C. | Yield g | Obs. g/g time | Norm. g/g/30 min. | MI | HLMI | MI |
| 1 | A | 1.5 | 485 | 105 | 114 | 2350/60 | 1175 | 0.220 | 13.7 | 62 |
| 2 | A | 1.5 | 704 | 95 | 185 | 2630/28 | 2820 | 0.025 | 2.7 | 108 |
| 3 | B | 5.0 | 644 | 95 | 268 | 4160/31 | 4030 | 0.12 | 14.2 | 118 |
| 4 | C | 3.6 | 591 | 95 | 213 | 3600/39 | 2200 | 0.024 | 4.0 | 167 |
| 5 | D | 2.5 | 632 | 95 | 204 | 3230/33 | 2940 | 0.038 | 3.6 | 95 |

The data in Table I demonstrate that the invention catalysts A, B, C are active ethylene polymerization catalysts. At the same reactor temperature, 95° C., the productivity results indicate that the invention catalysts and the comparison catalyst have approximately similar activities and MI potential when compared at similar Ti levels.

The polymerization results obtained indicate that cogel and tergel catalysts can be made by the two-stage hydrolysis process disclosed herein that are equivalent to similar catalysts made by prior art processes based on precipitation of alkali metal silicates with acids. The invention catalyst do not require the tedious, protracted washing needed by the prior art catalysts to reduce the alkali metal ion content and associated anions to a tolerable level.

EXAMPLE 6

Invention catalyst E was prepared in the same manner as invention catalyst C of Example 3. Comparison catalyst F was prepared in the same manner as compariethylene polymerization at 105° C. in isobutane containing 8 ppm TEB as described before. The results are given in Table III.

TABLE III

| | Ethylene Polymerization, 105° C., No Hydrogen | | | | | | | |
|---|---|---|---|---|---|---|---|---|
| | Catalyst | | Polymer | Calculated Productivity | | g/10 min. | | HLMI |
| Run No | No | Wt % Ti | Wt mg | Yield g | Obs. g/g time | Norm. g/g/30 min. | MI | HLMI | MI |
| 6 | E | 3.6 | 686 | 243 | 3542/20.7 | 5130 | —(a) | — | — |
| 7 | E | 3.6 | 961 | 287 | 2986/77.5 | 1160 | 1.04 | 53.3 | 51 |
| 8 | F | 2.5 | 800 | 246 | 3071/34.2 | 2690 | 1.08 | 49.5 | 46 |

(a)dash indicates not determined

The results in Table III demonstrate that the invention catalyst in run 7 and the comparison catalyst in run 8 have about the same melt index potential. This behavior is expected in view of the similar porosimetry results shown in Table II.

The run temperature of 105° C. selected is near the fouling temperature because of the presence of TEB. This could account for relatively sluggish activity shown in run 7 with the invention catalyst wherein borderline fouling is believed to have occurred. That the sluggish activity is not due to the catalyst itself is seen by comparison with run 6 in which excellent activity is shown.

EXAMPLE 7

A 1-step hydrolysis of a mixture of $Si(OC_2H_5)_4$ and $Ti(O-i-Pr)_4$ in n-propanol was tried by adding sufficient water to precipitate titania and silica. However, the greater reactivity of the titanate precludes a cogel being formed. Instead, TiO$_2$ comes out first and later, the SiO$_2$ comes out separately.

While this invention has been described in detail for the purpose of illustration it is not to be construed as limited thereby but is intended to cover all changes and modifications within the spirit and scope thereof.

I claim:

1. A method comprising:
   (a) partially hydrolyzing a silicate ester comprising at least one of an organopolysilicate and a tetraorganoxysilicate in an organic solvent under alkaline conditions using less than the stoichiometric amount of water required for complete hydrolysis;
   (b) thereafter combining the partially hydrolyzed product of (a) with a titanium tetraalkoxide; thereafter
   (c) adding sufficient water to complete the hydrolysis and produce a silica sol; and
   (d) combining said silica sol with sufficient base to form a silica-titania gel.

2. A method according to claim 1 wherein said silicate ester is said organopolysilicate.

3. A method according to claim 2 wherein said organopolysilicate is ethyl polysilicate.

4. A method according to claim 1 wherein said silicate ester is said tetraorganoxysilicate.

5. A method according to claim 4 wherein said tetraorganoxysilicate is tetra-n-propoxysilane.

6. A method according to claim 1 wherein said organic solvent of (a) is rendered alkaline through the use of concentrated ammonium hydroxide.

7. A method according to claim 1 wherein said organic solvent is an alcohol.

8. A method according to claim 7 wherein said alcohol is a 3 to 4 carbon atom alcohol.

9. A method according to claim 8 wherein said alcohol is n-propanol.

10. A method according to claim 1 said titanium tetraalkoxide is of the formula Ti(OR')$_4$ where R' is a 1 to 6 carbon atom alkyl group.

11. A method according to claim 10 wherein said tetraalkoxide is tetraisopropyl titanate.

12. A method according to claim 10 wherein the total amount of water used is within the range of 1.5 to 5 times the stoichiometric amount needed for complete hydrolysis.

13. A method according to claim 1 wherein the total amount of water used is within the range of 1.5 to 5 times the stoichiometric amount needed for complete hydrolysis.

14. A method according to claim 1 wherein said base of (d) is ammonium hydroxide.

15. A method according to claim 14 wherein said organic solvent is n-propanol and is rendered alkaline in step (a) through the use of concentrated ammonium hydroxide, water is present in step (a) in an amount sufficient to give 15-60 mole percent of complete hydrolysis of the stoichiometric amount for complete hydrolysis wherein said titanium tetraalkoxide is tetraisopropyl titanate and wherein in step (c) said water is added in an amount wherein the total water is within the range of 1.5 to 5 times the stoichiometric amount needed for complete hydrolysis.

16. A method according to claim 15 wherein a chromium compound is present in said silica.

17. A method according to claim 16 wherein the chromium compound is introduced prior to forming said gel so as to form a silica-titania-chromium tergel.

18. A method according to said 17 wherein said chromium compound is present in an amount sufficient to give 0.5 to 2 weight percent chromium based on the weight of said silica plus chromium compound after drying.

19. A method according to claim 1 comprising in addition introducing a chromium compound.

20. A catalyst produced by the method of claim 19.

21. A catalyst produced by the method of claim 18.

22. A method comprising:
   (a) partially hydrolyzing a silicate ester comprising at least one of an organopolysilicate and a tetraorganoxysilicate in an organic solvent under alkaline conditions using less than the stoichiometric amount of water required for complete hydrolysis;
   (b) thereafter combining the partially hydrolyzed product of (a) with a titanium tetraalkoxide; thereafter
   (c) adding sufficient water to complete the hydrolysis and produce a silica sol; thereafter
   (d) combining said silica sol with sufficient base to form a silica-titania gel; thereafter
   (e) drying said gel to form a xerogel, said xerogel also containing a chromium compound;
   (f) contacting at least one mono-1-olefin having 2 to 8 carbon atoms per molecule in a reaction zone under polymerization conditions with said xerogel; and
   (g) recovering a polymer.

23. A method according to claim 22 wherein said olefin is selected from ethylene, propylene, 1-butene, 1-pentene, 1-hexene and 1-octene.

24. A method according to claim 22 wherein said olefin comprises ethylene.

25. A method according to claim 22 wherein said polymerization is carried out under slurry conditions.

* * * * *